United States Patent
Sharma et al.

(10) Patent No.: US 11,172,410 B2
(45) Date of Patent: Nov. 9, 2021

(54) DEVICE, SYSTEM AND METHOD FOR SYNCHRONIZING MULTIPLE DEVICES

(71) Applicant: APPLE INC., Cupertino, CA (US)

(72) Inventors: Prateek Sharma, San Jose, CA (US); Sanjay K. Verma, San Jose, CA (US); Deepankar Bhattacharjee, Milpitas, CA (US); Sairam T. Gutta, Cupertino, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 15/233,517

(22) Filed: Aug. 10, 2016

(65) Prior Publication Data

US 2017/0094564 A1    Mar. 30, 2017

Related U.S. Application Data

(60) Provisional application No. 62/235,043, filed on Sep. 30, 2015.

(51) Int. Cl.
    *H04W 36/00*      (2009.01)
    *H04W 4/14*      (2009.01)

(52) U.S. Cl.
    CPC ......... *H04W 36/0022* (2013.01); *H04W 4/14* (2013.01)

(58) Field of Classification Search
    CPC ............ H04L 65/1016; H04L 65/1006; H04L 65/1069; H04L 65/40; H04L 12/66; H04L 65/1073; H04L 29/06027; H04L 29/06197; H04W 48/18; H04W 80/10; H04W 88/06; H04W 60/00; H04W 88/02; H04W 76/02
See application file for complete search history.

(56) References Cited

U.S. PATENT DOCUMENTS

| 2005/0288045 A1* | 12/2005 | Yang ................ H04L 67/14 455/466 |
| 2007/0014281 A1* | 1/2007 | Kant ............. H04L 29/06027 370/352 |

(Continued)

FOREIGN PATENT DOCUMENTS

| CN | 103947162 | 7/2014 |
| GB | 2 439 365 | 12/2007 |

*Primary Examiner* — Asad M Nawaz
*Assistant Examiner* — Najeeb Ansari
(74) *Attorney, Agent, or Firm* — Fay Kaplun & Marcin, LLP

(57) ABSTRACT

An apparatus, method and system for receiving an input indicating a mode into which to set a user equipment (UE) and at least one further UE associated with the UE, determining whether a connection circuit switched (CS) connectivity or packet switched (PS) connectivity and when the connection is the CS connectivity, generating a short messaging service (SMS) message that indicates the mode corresponding to the input. Also, receiving connectivity information for a plurality of UEs from a cloud network component, the UEs being associated with one another, the connectivity being CS connectivity or PS connectivity, receiving a response indication corresponding to a response performed on an incoming call by a first one of the UEs, the first UE having a PS connectivity, matching the response indication to a corresponding cause code and transmitting the corresponding cause code to a second one of the UEs having a CS connectivity.

14 Claims, 7 Drawing Sheets

(56) References Cited

U.S. PATENT DOCUMENTS

| | | | |
|---|---|---|---|
| 2007/0238466 A1* | 10/2007 | Buckley | H04Q 3/0045 |
| | | | 455/445 |
| 2007/0238467 A1* | 10/2007 | Buckley | H04Q 3/0045 |
| | | | 455/445 |
| 2008/0117893 A1* | 5/2008 | Witzel | H04W 4/14 |
| | | | 370/352 |
| 2009/0055142 A1 | 2/2009 | Nitta et al. | |
| 2009/0265764 A1 | 10/2009 | Schultz et al. | |
| 2010/0103927 A1* | 4/2010 | Bakker | H04M 3/428 |
| | | | 370/352 |
| 2012/0044867 A1* | 2/2012 | Faccin | H04W 60/00 |
| | | | 370/328 |
| 2012/0099524 A1* | 4/2012 | Cai | H04L 12/5875 |
| | | | 370/328 |
| 2013/0290440 A1* | 10/2013 | Pratt | G06Q 10/109 |
| | | | 709/206 |
| 2015/0055550 A1 | 2/2015 | Suryavanshi | |
| 2015/0245186 A1* | 8/2015 | Park | H04W 4/16 |
| | | | 455/417 |
| 2015/0245197 A1* | 8/2015 | Lee | H04W 8/205 |
| | | | 455/418 |
| 2016/0036991 A1* | 2/2016 | Brewer | H04L 65/1076 |
| | | | 370/356 |
| 2017/0012875 A1* | 1/2017 | Chang | H04L 45/745 |
| 2017/0070543 A1* | 3/2017 | Balasubramanian | |
| | | | H04L 65/1069 |
| 2019/0174003 A1* | 6/2019 | Chandramouli | H01F 7/0278 |

* cited by examiner

DEVICE, SYSTEM AND METHOD FOR SYNCHRONIZING MULTIPLE DEVICES

BACKGROUND INFORMATION

This application claims priority to U.S. Provisional Application 62/235,043 entitled "Device, System and Method for Synchronizing Multiple Devices," filed on Sep. 30, 2015, the entirety of which is incorporated herein by reference.

BACKGROUND INFORMATION

A user may utilize a plurality of different devices (e.g., user equipment (UE)) such as electronic devices that are each capable of connecting to one or more networks. Examples of different devices may include a personal mobile phone, a work issued mobile phone, a tablet computer, a desktop computer, a VoIP phone, a wearable, etc. Each UE may be linked to the user in a variety of different manners, for example, using a registration procedure for each of the UEs or a cloud functionality, the user may associate each UE to an account of the user such as a login or a mobile number of one of the UEs. In this manner, the plurality of UEs of the user may each be linked for various functionalities to be used or performed.

SUMMARY

In one exemplary embodiment, a method is described as being performed by a user equipment (UE) configured to establish a connection using one of a circuit switched (CS) connectivity or a packet switched (PS) connectivity. The method includes receiving an input indicating a mode into which to set the UE and at least one further UE associated with the UE, determining whether the connection is one of the CS connectivity or the PS connectivity and when the connection is the CS connectivity, generating a short messaging service (SMS) message that indicates the mode corresponding to the input.

In a further exemplary embodiment, a method is described as being performed by a user equipment (UE) configured to establish a connection using one of a circuit switched (CS) connectivity or a packet switched (PS) connectivity. The method includes receiving a message from a network entity indicating that the UE is to perform a mode change operation, the message further including a selected mode for the UE and performing the mode change operation to change the UE into the selected mode.

In another exemplary embodiment, a user equipment has a transceiver configured to establish a connection using one of a circuit switched (CS) connectivity or a packet switched (PS) connectivity and a processor configured to receive an input indicating a mode in which to set the user equipment and at least one further user equipment associated with the user equipment, the processor further configured to determine whether the connection is one of the CS connectivity and the PS connectivity, the processor, when the connection is the CS connectivity, configured to generate a short messaging service (SMS) message that indicates the mode corresponding to the input.

In a further exemplary embodiment, a method is described as being performed by a telephony application server. The method includes receiving connectivity information for a plurality of user equipment (UE) from a cloud network component, the UEs being associated with one another through a user account, the connectivity being one of a circuit switched (CS) connectivity or a packet switched (PS) connectivity, receiving a response indication (e.g., SIP response) corresponding to a response performed on an incoming call by a first one of the UEs, the first UE having a PS connectivity, matching the response indication to a corresponding cause code and transmitting the corresponding cause code to a second one of the UEs, the second UE having a CS connectivity.

In another exemplary embodiment, a telephony application server has a transceiver configured to establish a connection to a cloud network component and a processor receiving connectivity information for a plurality of user equipment (UE) from the cloud network component, the UEs being associated with one another through a user account, the connectivity being one of a circuit switched (CS) connectivity and a packet switched (PS) connectivity, the processor receiving a response indication (e.g., SIP response) corresponding to a response performed on an incoming call by a first one of the UEs, the first UE having a PS connectivity, the processor matching the response indication to a corresponding cause code, wherein the corresponding cause code is transmitted to a second one of the UEs, the second UE having a CS connectivity.

DETAILED DESCRIPTION

Figure 1:
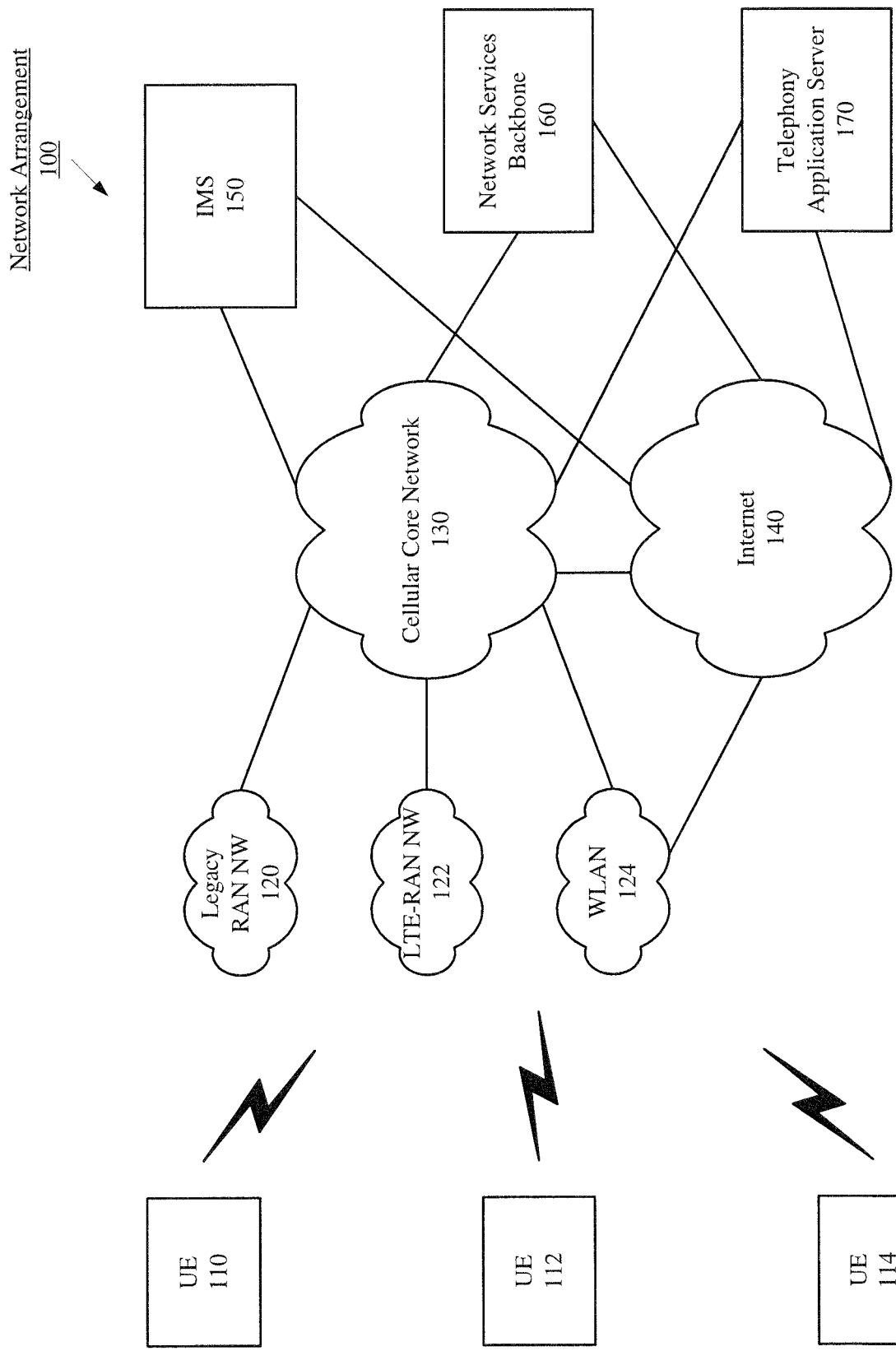
FIG. 1 shows a network arrangement according to various embodiments described herein.

The exemplary embodiments may be further understood with reference to the following description and the related appended drawings, wherein like elements are provided with the same reference numerals. The exemplary embodiments are related to a device, system, and method for synchronizing a plurality of user equipment (UE) that are associated with each other. Specifically, the UEs may be related to each other by being associated with, for example, a single user or a single account. The UEs may be associated and have a connectivity to various different access networks such that a functionality may be utilized and/or shared by all of the associated UEs. The exemplary embodiments provide a mechanism to synchronize the UEs when at least one of the UEs is incapable of transmitting and/or receiving appropriate signals that triggers a synchronization feature. That is, the synchronization feature may utilize a propagation for each of the associated UEs to perform a particular functionality.

As will be described in further detail below, the UEs associated with each other via a single user or account may utilize a connectivity functionality with an access network to establish a connection to various services such as an Internet Protocol (IP) Multimedia Subsystem (IMS). The IMS may provide cloud services for the UEs. The cloud services may include a variety of different features such as synchronization features through propagation of signals to each of the associated UEs. The signals utilized in such features may require a specified type of connectivity such as a packet switched (PS) connectivity to transmit/receive the data packets associated therewith. However, one or more of the associated UEs may not have the PS connectivity, but may be connected to a different access network such as with a circuit switched (CS) connectivity. These UEs may be incapable of properly synchronizing due to an incapability of transmitting/receiving the data packets used in the propagation. The exemplary embodiments are configured to address when the associated UEs experience this scenario. According to a first feature under this scenario, the exemplary embodiments provide a mechanism to synchronize an entered mode on one of the associated UEs for propagation to the other associated UEs. According to a second feature under this scenario, the exemplary embodiments provide a mechanism to propagate a response to a communication on one of the associated UEs to the other associated UEs.

FIG. 1 shows a network arrangement 100 according to various embodiments described herein. The exemplary network arrangement 100 includes UEs 110-114. In this example, it is assumed that the UEs 100-114 are associated with a single user. For example, the UE 110 may be the user's mobile phone, the UE 112 may be the user's tablet computer, and the UE 114 may be the user's desktop computer. Those skilled in the art will understand that, in addition to the examples provided above, the UEs may be any type of electronic component that is configured to communicate via a network, e.g., mobile phones, tablet computers, desktop computers, smartphones, phablets, embedded devices, wearables, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes. However, as will be understood from the description herein, the exemplary embodiments may relate to when at least two UEs 110-114 are present in the network arrangement 100.

Each of the UEs 110-114 may be configured to communicate with one or more networks. In this example, the networks with which the UEs 110-114 may communicate are a legacy radio access network (RAN) 120, a LTE RAN (LTE-RAN) 122, and a wireless local area network (WLAN) 124. In this example, each of the networks 120-124 is a wireless network with which the UEs 110-114 may communicate wirelessly. However, it should be understood that the UEs 110-114 may also communicate with other types of networks using a wired connection. With regards to the exemplary embodiments, the UEs 110-114 may establish a connection with the LTE-RAN 122 to perform VoLTE calls with other UEs. For example, the UEs 110-114 may have a LTE chipset to communicate with the LTE-RAN 122. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base stations (Node Bs, eNodeBs, HeNBs, etc.) that are configured to send and receive traffic from UEs that are equipped with the appropriate cellular chip set. Examples of the legacy RAN 120 may include those networks that are generally labeled as 2G and/or 3G networks and may include CS voice calls and PS data operations. For illustrative purposes, the legacy RAN 120 may represent an access network utilizing CS connectivity with the UEs 110-114 while the LTE-RAN 122 may represent an access network utilizing PS connectivity with the UEs 110-114. That is, the CS connectivity may be Code Division Multiple Access (CDMA), Wideband CDMA (WCDMA), Global System for Mobile Communications (GSM), etc. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the UEs 110-114 to communicate with the WLAN 124.

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IMS 150. The IMS 150 may be generally described as an architecture for delivering multimedia services to the UEs 110-114 using the IP protocol. The IMS 150 may include a variety of components to accomplish this task. For example, a typical IMS 150 includes a Home Subscriber Server (HSS) that stores subscription information for a user of the UEs 110-114. The HSS may indicate that the UEs 110-114 are associated with one another, in particular, associated with a single user. Thus, when the UEs of the user registers with the IMS 150 (e.g., connects thereto), the subscription information may be utilized to determine various features. For example, this subscription information is used to provide the correct multimedia services to the user. In another example, this subscription information is used to provide synchronization or propagation services to the user. The IMS 150 may communicate with the cellular core network 130 and the Internet 140 to provide the multimedia services to the UEs 110-114. The IMS 150 is shown in close proximity to the cellular core network 130 because the cellular provider typically implements the functionality of the IMS 150. However, it is not necessary for this to be the case such as when the IMS 150 is provided by another party.

Thus, the network arrangement 100 allows the UEs 110-114 to perform functionalities generally associated with computers and cellular networks. For example, the UEs 110-114 may perform the VoLTE calls to other parties, may browse the Internet 140 for information, may stream multimedia data to the UEs 110-114, etc.

However, as described above, not every one of the UEs 110-114 may have the same communication capabilities with the networks 120, 122, 124, 130, 140. This lack of communication with one or more of the networks may be due to the capabilities of the UEs 110-114, e.g., the UE does not include a cellular chip, may be due to a limitation of the network, e.g., a cellular network does not have a base client station within range of the UE, may be due to a limitation created by the environment, e.g., an interference in a frequency of the network, etc. This lack of communication with one or more networks may result in the UE being unable to avail itself of the functionalities that are available via one or more of the networks.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network arrangement may further include a telephony application server (TAS) 170 that is in communication either directly or indirectly with the Internet 140 and the cellular core network 130. The TAS may be generally described as an entity in a telephone network such as that utilized by providers of the cellular core network that performs functionalities unrelated (or tangential) to the routing of messages through the telephone network. For example, the TAS may perform functionalities associated with voice mail features, toll-free numbers, call forwarding features, bridges, etc. The TAS 170 may interact with the UEs 110-114 and/or the networks 120, 122, 124, 130, 140 to provide these functionalities.

The network services backbone 160 and the TAS 170 may be provided by any entity or a set of entities. In one example, the network services backbone 160 and/or the TAS 170 is provided by the supplier of one or more of the UEs 110-114. In another example, the network services backbone 160 and/or the TAS 170 is provided by the cellular network provider. In still a further example, the network services backbone 160 and/or the TAS 170 is provided by a third party unrelated to the cellular network provider or the supplier of the UEs 110-114. The network services backbone 160 and the TAS 170 as well as the IMS 150 may be utilized as components collectively used as a cloud network component.

As discussed above, the exemplary embodiments may relate to when the UEs 110-114 that are associated with each other such as through a single user are connected to one of the legacy RAN 120, the LTE-RAN 122, and/or the WLAN 124. The exemplary embodiments further relate to a synchronization or propagation functionality to be performed from the association. For example, the UE 110 may be a primary device of the user such as a cellular capable smart phone that may utilize the legacy RAN 120, the LIE-RAN 122, and/or the WLAN 124 while the UEs 112, 114 may each be a secondary device of the user such as a tablet and a wearable that may utilize the LIE-RAN 122 and/or the WLAN 124. As noted above, the associated UEs 110-114 may be in a scenario where one of the associated UEs 110-114 may only have a CS connectivity that prevents the synchronization or propagation functionality from being used properly. For example, the UE 110 may be connected to the legacy RAN 120 only while the UEs 112, 114 may be connected to at least one of the LTE-RAN 122 and/or the WLAN 124.

Mode Propagation

Exemplary embodiments described herein provide a propagation of a mode that is extended to the UEs 110-114 that are associated with a single user. As discussed above, the association between the UEs 110-114 may be maintained through functionalities provided by components and services included in the network services backbone 160. That is, the network services backbone 160 may be used to associate the UEs 110-114 with a user account of a user. In one example, the association of the UEs 110-114 may link a mobile device number (MDN) of the user to each of the UEs 110-114. The MDN may be assigned to the user when one of the UEs 110-114 (e.g., the UE 110) is purchased or obtained and services are provided thereto by a service provider (e.g., via a SIM card). For example, the UE 110 may be purchased and have a service provider provide a cellular connectivity in which a call application may be used. Accordingly, the UE 110 may have the MDN assigned thereto for other devices to establish a connection.

One of the services provided by the network services backbone 160 may be to store and update associations among the different UEs 110-114. As described above, each of the UEs 110-114 are associated with the same user. Thus, the network services backbone 160 may store information that indicates this association of the user with each of the UEs 110-114 and may then also store (or link) the relationship of the UEs 110-114 with each other based on their association with the user. This association among the UEs 110-114 may be used as one of the bases for the network services backbone 160 to provide propagation operations to the UEs 110-114. Specifically, each of the UEs 110-114 may have the MDN linked such that a communication transmitted to the MDN may reach all the UEs 110-114.

The exemplary device, system and method provide a mode propagation mechanism in which a mode set on a first one of the associated UEs 110-114 is propagated to the other associated UEs 110-114 such that all of the associated UEs may have a synchronized mode that is set. With increased usage of UE association and cloud services, features associated therewith may experience potential issues that create an unpleasant user experience. For example, although the feature provides a convenience of receiving calls on any of the associated UEs 110-114 (since all the UEs 110-114 may provide an alert of the incoming call as they are linked to the same MDN), a mode change such as to "Do Not Disturb" (DND) on one of the associated UEs 110-114 may not propagate properly to the other associated UEs 110-114 (e.g., due to a connectivity issue). Therefore, the other associated UEs 110-114 may still provide the alert, which may entail playing an audio output that disturbs the user. This may lead to a poor user experience as the user may continue to hear the other associated UEs 110-114 continue to ring despite putting one of the associated UEs in the DND mode that should have propagated to the other associated UEs. Therefore, the exemplary embodiments provide the propagation mechanism that may address this propagation issue, particularly when related to a connectivity issue such as when one of the associated UEs only has CS connectivity.

Figure 2:
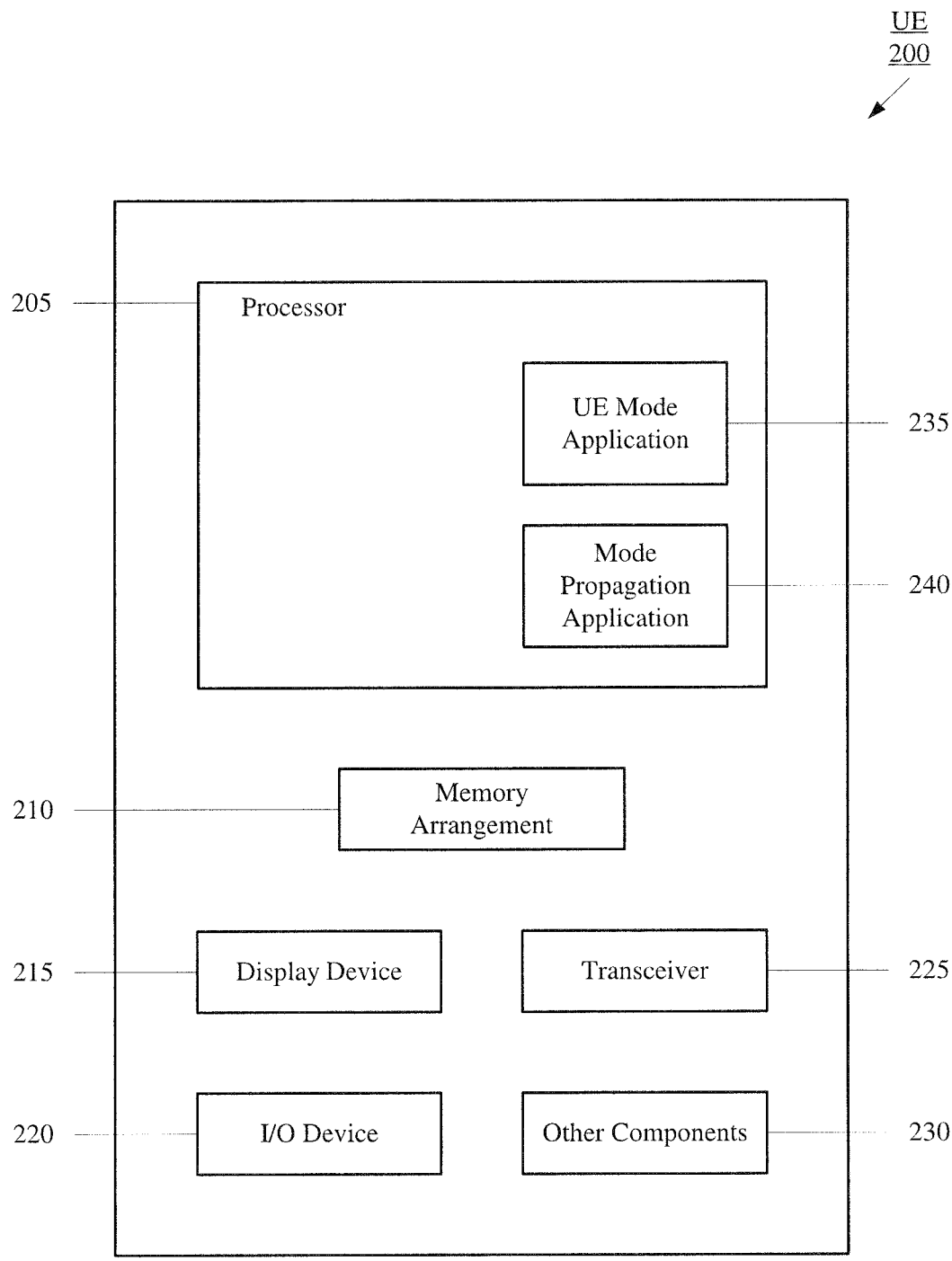
FIG. 2 shows a user equipment configured to propagate a mode according to various embodiments described herein.

FIG. 2 shows a UE 200 configured to propagate a mode according to various embodiments described herein. The UE 200 may represent any electronic device that is configured to perform wireless functionalities and may be representative of the UEs 110-114. Specifically, the UE 200 may have a mode change input entered thereon and perform an operation that triggers the propagation of the mode to the other associated UEs. Using the above example, the UE 200 may correspond to the UE 110 while the other associated UEs may be the UEs 112, 114. However, it is again noted that the UE 200 may also represent the other UEs 112, 114 that may perform substantially similar operations. The UE 200 may be a portable device such as a personal mobile phone, a work issued mobile phone, a tablet computer, a desktop computer, a VoIP phone, a wearable, etc. The UE 200 may also be a client stationary device such as a desktop terminal. The UE 200 may be configured to perform cellular and/or WiFi functionalities. The UE 200 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 200 to other electronic devices, etc.

The processor 205 may be configured to execute a plurality of applications of the UE 200. For example, the applications may include a web browser when connected to a communication network via the transceiver 225. In another example, the processor 205 may execute a call application that enables the UE 200 to perform a call functionality. It should be noted that the call functionality may refer to any type of communication session. For example, the communication session may be an audio only call functionality (e.g., phone call), an audio/video communication functionality, etc. Therefore, the call functionality may utilize the MDN of the associated UEs 110-114 such that when acting as an originating device calling a terminating device, an identification is the MDN and when acting as a terminating device receiving a call from an originating device, the originating device uses the MDN.

The processor 205 may be configured to execute further applications of the UE 200. In a further example and according to the exemplary embodiments, the processor 205 may execute a UE mode application 235. The UE mode application 235 may receive an input from the user indicating a desired mode into which to place the UE 200 (as well as the other associated UEs). In a first example, the mode may be a "Do Not Disturb" mode in which notifications may be deactivated and communication applications such as the call application may be deactivated. In a second example, the mode may be a sleep mode in which applications and various processes are deactivated (while background processes such as signaling with a base station may remain active). In a third example, the mode may be a wake mode in which all applications and processes may resume its operations. In yet another example and according to the exemplary embodiments, the processor 205 may execute a mode propagation application 240. As will be described in further detail below, the mode propagation application 240 may receive a signal from the UE mode application 235 indicating the desired mode that is entered and determine a current connectivity to determine further operations to be performed in setting the mode and propagating the mode to the other associated UEs 112, 114.

It should be noted that the UE mode application 235 and the mode propagation application 240 being separate applications is only exemplary. The functionality described herein for these two applications may be implemented in a single application. In addition, the functionality described herein for these two applications may also be implemented into another application. For example, the communication application that implements the VoLTE functionality may also implement the functionality of the UE mode application 235 and the mode propagation application 240.

It should be noted that the above noted applications each being an application (e.g., a program) executed by the processor 205 is only exemplary. The functionality associated with the applications may also be represented as a separate incorporated component of the UE 200 or may be a modular component coupled to the UE 200, e.g., an integrated circuit with or without firmware.

The memory 210 may be a hardware component configured to store data related to operations performed by the UE 200. Specifically, the memory 210 may store data related to the call application, UE mode application 235, and the mode propagation application 240. For example, a current connectivity of the UE 200 may be stored for use by the mode propagation application 240. The display device 215 may be a hardware component configured to show data to a user while the I/O device 220 may be a hardware component that enables the user to enter inputs. For example, the UE mode application 235 may show a menu of different modes on the display device 215 that allows the user to enter a desired mode using the I/O device 220. It should be noted that the display device 215 and the I/O device 220 may be separate components or integrated together such as a touchscreen. The transceiver 225 may be a hardware component configured to transmit and/or receive data. That is, the transceiver 225 may enable communication with other electronic devices directly or indirectly through a network based upon an operating frequency of the network. The transceiver 225 may operate on a variety of different frequencies or channels (e.g., set of consecutive frequencies).

According to the various exemplary embodiments, the UEs 110-114 may synchronize a selected mode entered on one of the UEs 110-114 that is propagated to the other UEs 110-114 through their association with each other. Specifically, the mode propagation application 240 may receive an indication of the selected mode and generate a corresponding message to be propagated to each of the UEs 110-114. The mode propagation application 240 may generate the message based upon the connectivity of the UEs 110-114. As will be described in further detail below, a first type of message may be generated when each of the UEs 110-114 has a PS connectivity such as with the LTE-RAN 122 or the WLAN 124 and a second type of message may be generated when at least one of the UEs 110-114 (particularly the UE generating the message) has a CS connectivity such as with the legacy RAN 120. It is again noted that for illustrative purposes, the legacy RAN 120 is used to represent a CS connectivity only. However, those skilled in the art will understand that the legacy RAN 120 may also include PS connectivity functionalities.

According to a first exemplary embodiment, the mode propagation application 240 may determine the connectivity of the UE 200. As noted above, the connectivity may be a PS connectivity or a CS connectivity. In the first exemplary embodiment, the mode propagation application 240 may determine that the UE 200 has a PS connectivity such as when connected to the LTE-RAN 122 or the WLAN 124. With the PS connectivity, the UE 200 may have access to cloud services such as those provided by the IMS 150 and/or the network services backbone 160. Therefore, according to the first exemplary embodiment, the mode propagation application 240 may generate a PS message that is transmitted to the IMS 150 and/or the network services backbone 160. That is, the PS message may utilize a cloud framework for the propagation feature to be performed.

Using the above mechanism, the user may enter a selected mode via the UE mode application 235. The selected mode may be provided to the mode propagation application 240. The mode propagation application 240 may first determine that the UE 200 has PS connectivity and then generate the PS message including the selected mode. The PS message may be transmitted through the cloud framework such that the PS message is propagated across the other associated UEs by uploading the desired mode to the cloud via the PS message and pushing the PS message to the other associated UEs. Thus, the UE 200 that has the selected mode entered may update its mode directly from the mode input. Whereas, the associated UEs may receive the PS message to update their mode as the network services backbone 160 may determine these associated UEs. It should be noted that the UE 200 may also update its mode by receiving the PS message as the network services backbone 160 may transmit the PS message to all associated UEs, which would also include the UE 200. However, the PS message may also include an identification of the UE 200 such that the UE 200 would understand that it was the device that originally generated the PS message and the mode was selected via the entered input. Thus, there is no need for the UE 200 to update the mode based on the PS message.

According to a second exemplary embodiment, the mode propagation application 240 may again determine the connectivity of the UE 200. In contrast to the first exemplary embodiment, in the second exemplary embodiment, the mode propagation application 240 may determine that the UE 200 has a CS connectivity such as when connected to the legacy RAN 120. With the CS connectivity, the UE 200 may not have access to the cloud services, meaning that PS messages cannot be transmitted through this CS connectivity. Therefore, according to the second exemplary embodiment, the mode propagation application 240 may utilize a CS message that leverages short messaging service (SMS) messages, which are capable of being transmitted through a CS connectivity.

In the second exemplary embodiment, the mode propagation application 240 may generate a CS message that is transmitted as a SMS message to the legacy RAN 120. The CS message may utilize a unique identifiable string or format that is recognized by the mode propagation application 240 (when received) as a trigger for a mode change. The CS message may therefore include this trigger such that UEs that receive the CS message do not utilize a conventional SMS functionality of displaying an associated text for viewing. Instead, the trigger may cause the mode propagation application 240 to utilize the received CS message. The mode propagation application 240 may also generate the CS message based upon the selected mode. For example, a first selected mode may utilize a first CS message that includes the trigger and a first further identifier of the first selected mode (further portion of the string), a second selected mode may utilize a second CS message that includes the trigger and a second further identifier of the second selected mode, etc.

The mode propagation application 240 may also utilize an aspect of the association of the UEs as the basis for propagating the CS message. Specifically, the mode propagation application 240 may set the destination of the CS message as its own MDN. As each of the associated UEs is linked to the MDN, the CS message that is received by the service provider for the SMS service may transmit the CS message to the MDN. In this manner, each of the associated UEs may receive the CS message. That is, the underlying network components such as the TAS 170, a SMS center (SMSC), a message service center (MSC), etc. may be responsible for sending the CS message (that is formatted as a SMS) with the trigger and the selected mode to the UE 200 and the associated UEs. Although the underlying network components may be responsible for this propagation feature, it is noted that the underlying network components may not require any change to their conventional functionality.

Using the above mechanism, the user may enter a selected mode via the UE mode application 235. The selected mode may be provided to the mode propagation application 240. The mode propagation application 240 may first determine that the UE 200 has CS connectivity and then generate the CS message including the trigger and the selected mode as well as setting the destination as the MDN linked to the associated UEs. The CS message may be transmitted as a SMS message to the legacy RAN 120 and the underlying network components such that the CS message is propagated by transmitting the CS message in a conventional manner using the MDN. Thus, the UE 200 that has the selected mode entered may update its mode directly from the entered input. The associated UEs may receive the CS message to update their mode. Specifically, the associated UEs, via the mode propagation application 240, may identify the trigger to determine that the CS message is being received for a mode change and also determine the selected mode identified in the CS message. The mode propagation application 240 may provide a signal to the UE mode application 235 of the associated UEs for the selected mode to be set. As noted above, the trigger may prevent the CS message transmitted as a SMS message from being displayed on the display device 215 as an incoming SMS message. Upon receiving the CS message, the UE 200 (that generated the CS message) may also prevent the CS message from being displayed. It should again be noted that the UE 200 may also update its mode by receiving the CS message as the CS message is transmitted using the MDN to which the UE 200 is also linked. However, the UE 200 may have already updated its mode from the entered selected mode such that the trigger may be ignored for purposes of updating the mode on the UE 200.

It should be noted that the above exemplary embodiments using the connectivity of the UE 200 as the basis for generating the message are only exemplary. According to another exemplary embodiment of mode propagation, the connectivity of the other associated UEs may also be used as a basis for generating the message. For example, through various communication signaling, the associated UEs may receive information corresponding to the type of connectivity experienced by the other associated UEs. For example, all three associated UEs may have a PS connectivity. The IMS 150 and/or the network services backbone 160 may generate a signal or message that is provided to all the associated UEs. The mode propagation application 240 may accordingly be aware of the connectivity of the UE 200 and all associated UEs and that the connectivity is a PS connectivity. The mode propagation application 240 may therefore utilize the PS message with confidence that the selected mode is synchronized using the above mechanism. In another example, a first associated UE may have a CS connectivity, a second associated UE may have a PS connectivity, and a third associated UE may also have a PS connectivity. The mode propagation application 240 that generates the message may be performed by the second associated UE. The mode propagation application 240 may again receive an indication of the connectivity types of the associated UEs. However, the indication may only indicate that the third associated UE has a PS connectivity. The indication may not have a corresponding indication for the first associated UE or may have an assumed indication based upon an absence of signaling used for a PS connectivity. Thus, when attempting to perform a mode propagation, the mode propagation application 240 of the second associated UE having a PS connectivity may utilize the CS message to ensure that all the associated UEs may be synchronized. In a further example, the CS message may always be used to ensure that the mode synchronization may be performed properly regardless of the connectivity type.

According to a further exemplary embodiment for mode propagation, supplementary services on a Universal Terrestrial Radio Access Network (UTRAN) or a GSM Edge RAN (GERAN) may be used. Specifically, upon receiving a selected mode on the UE mode application 235, the UE 200 may transmit a supplementary services message with a defined cause code that triggers the core network to enable the selected mode on the associated UEs. That is, the SMS messaging format described above may also be performed using these supplementary services. The MSC may thereafter communicate the supplementary services message to the TAS 170 that has access to the information about the association to trigger a SIP Notify message. The SIP Notify message may include a reason header such as the selected mode and an application layer on the associated UEs may enable the selected mode based on a string match in the SIP Notify message.

It is again noted that the selected mode is set using the PS or CS message and not manually entered on the propagated UEs. Therefore, the exemplary embodiments may provide a feature that the telephony component of the propagated UEs may implement a notification (e.g., a pop-up) on the display device 215 to intimate to the user about the change in mode upon the conclusion of this mode propagation functionality.

Figure 3:
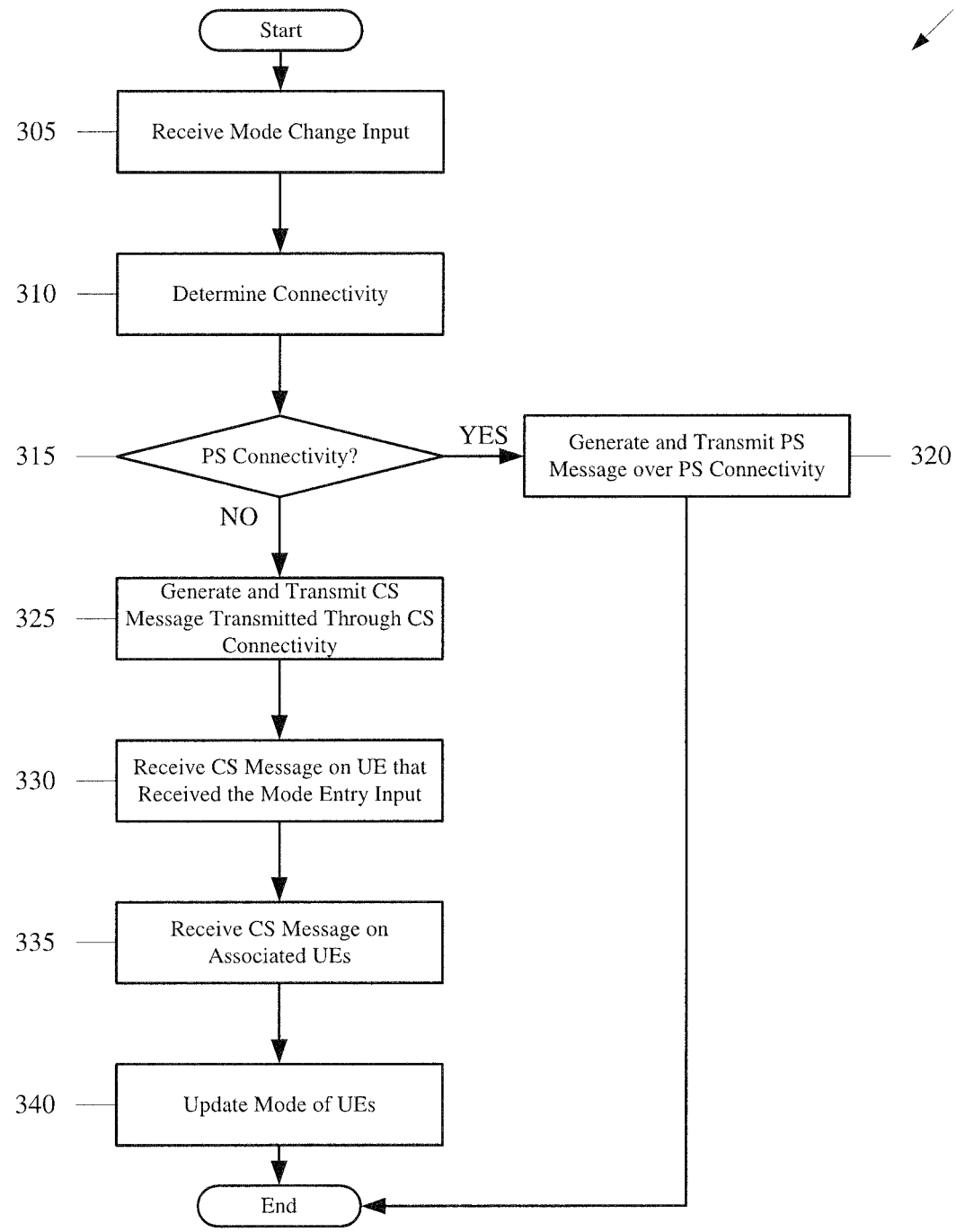
FIG. 3 shows a method for propagating a mode according to various embodiments described herein.

FIG. 3 shows an exemplary method 300 for propagating a mode according to various embodiments described herein. The method 300 will be described with regard to the network arrangement 100 of FIG. 1 and the UE 200 of FIG. 2. As discussed above, the UE 200 may represent each of the UEs 110-114 and the UEs 110-114 may be associated with one another via a MDN of a user. The description of the method 300 will be described with regard to the UE 110 having a CS connectivity (e.g., connected to the legacy RAN 120) while the UEs 112, 114 have a PS connectivity (e.g., connected to the LTE-RAN 122 or the WLAN 124).

In 305, the UE receives a mode change input. As discussed above, the UE may execute the UE mode application 235 that provides a menu on the display device 215 that shows the various different modes that are available to set the UE and the I/O device 220 may enable the user to select one of the modes. The selected mode may be provided to the mode propagation application 240, which initiates further operations.

In 310, the UE determines a connectivity. As discussed above, the UE may execute the mode propagation application 240 that may access information indicating a type of connectivity being used by the UE. For example, according to the example for the method 300, if the UE 110 is performing these operations, the mode propagation application 240 may determine a CS connectivity. In another example, if one of the UEs 112, 114 is performing these operations, the mode propagation application 240 may determine a PS connectivity. In 315, the UE determines a manner of performing further operations based upon the connectivity type. Specifically, if the UE determines a PS connectivity, the UE continues the method 300 to 320. However, if the UE determines a CS connectivity, the UE continues the method 300 to 325.

In 320, since the UE has a PS connectivity, the UE generates a PS message to propagate the mode change to the associated UEs. As discussed above, the PS message may be a data packet used in conveying information to the IMS 150 and/or the network services backbone 160. That is, the PS message may be in a format utilized by a cloud network. The PS message may include the selected mode such that the PS message may be propagated to the associated UEs. Once generated, the PS message may be transmitted to the appropriate network components. For example, the UE 112 may have determined a PS connectivity and generated the PS message to propagated to the UE 110 and 114.

Returning to 315, with a CS connectivity, the UE continues the method 300 to 325. In 325, since the UE has a CS connectivity, the UE generates a CS message to propagate the mode change to the associated UEs. As discussed above, the CS message may be in a format corresponding to SMS messages. The CS message may be generated to include a unique trigger that indicates to the receiving associated UEs that the CS message is being used to update a mode of the associated UEs. The CS message may also be generated to include a further indicator of the selected mode. The CS message may further be generated to have a destination of the MDN linked to the UEs. Thus, by transmitting the CS message, the CS message is returned to the current UE (330) and also propagated to the associated UEs that are linked by the MDN (335).

In 340, the mode of each of the associated UEs is updated based upon the received CS message. As discussed above, the current UE that performed the generation and transmission of the CS message may update the mode based upon the entered input on the UE mode application 235. However, the current UE also receives the CS message. Upon receiving the CS message, the current UE may perform several operations such as preventing the CS message from initiating SMS related functionalities. The current UE may also ignore the mode update that is triggered or may perform the mode update as it is redundant. The associated UEs may also perform several operations upon receiving the CS message. Specifically, substantially similar operations may also be performed on the associated UEs except that the mode update is also performed.

It should be noted that the method 300 may be changed or adapted for various features according to the exemplary embodiments. For example, as discussed above, the mode propagation application 240 may consider the connectivity of the current UE and the associated UEs. Thus, the method 300 may include an operation that receives information corresponding to the current UE and the associated UEs. The information may indicate when the associated UEs has a PS connectivity (whereas an absence of the indication may imply a CS connectivity). The determination to utilize the PS message or the CS message may be determined based upon whether any of the current UE and/or the associated UEs has a CS connectivity.

It should also be noted that the above description relates to a plurality of modes that may be set for the associated UEs. Specifically, there may be three or more modes that may be set for the UEs. However, this is only exemplary. The exemplary embodiments may be adapted for use when there are only two modes to set the UEs. Accordingly, there may only be one CS message that is generated for use in setting the modes of the UEs. Thus, reception of the CS message may prompt the mode to change from whatever mode the UE is currently in. A further reception of the CS message may prompt the mode to change back.

In another manner of utilizing various exemplary embodiments, there may be a unique trigger associated with each of the different modes that may be set for the UEs. For example, a first mode may have a first trigger associated therewith, a second mode may have a second trigger associated therewith, a third mode may have a third trigger associated therewith, etc. The different modes may be turned on/off accordingly and the UE mode application 240 may select an overall mode based upon how the different modes are activated or deactivated. Thus, receiving a CS message with the first trigger may update the first mode to turn on or off based upon whether it already is on or off. A subsequent CS message with the second trigger may perform a substantially similar operation for the second mode. The UE mode application 240 may accordingly determine the mode to set the UE, which may also entail a combination of the modes. In this manner, the CS messages may be generated with only the unique trigger for the corresponding mode without any further indication necessary.

Various exemplary embodiments provide a device, system, and method of propagating a mode to a plurality of associated UEs. The associated UEs may be linked to a user and a MDN of the user. When the UE that has a mode changed thereon, a message may be generated and transmitted to synchronize the mode on the other UEs. Specifically, based upon the connectivity of the UE, a message may be generated. If the connectivity indicates a CS connectivity, the message may be transmitted as a SMS message bound for the MDN of the UE. Thus, all of the associated UEs will receive the message as the UEs are linked by the MDN.

Response Propagation

With reference to FIG. 1, various exemplary embodiments relate to one of the UEs 110-114 performing a real-time communication. For example, the UE 110 may be the mobile originating (MO) UE that invites a further UE, which may be a mobile terminating (MT) UE. In another example, the UE 110 may be the MT UE that responds to an invitation from a further UE, which may be a MO UE. The real-time communication may be a voice only communication, a video communication, etc. The real-time communication may be performed in various different ways (e.g., voice only, video and voice, etc.) using different types of mechanisms (e.g., requiring a packet switched connectivity such as LTE). However, for illustrative purposes, the real-time communication is hereby referred to as a "call".

Various exemplary embodiments described herein provide a propagation of a response to an incoming call (i.e., when the UE is the MT UE) that is extended to the UEs 110-114 that are associated with a single user. As discussed above, the association between the UEs 110-114 may be maintained through functionalities provided by components and services included in the network services backbone 160. That is, the network services backbone 160 may be used to associate the UEs 110-114 with a user account of a user. Thus, a synchronization feature may be performed across the UEs 110-114 from their linkage to one another based upon any type of association criteria such as a user account identification, a mobile device number (MDN), etc.

One of the services provided by the network services backbone 160 may be to store and update associations among the different UEs 110-114. As described above, each of the UEs 110-114 may be associated with the same user, the same account, etc. Thus, the network services backbone 160 may store information that indicates this association of the user with each of the UEs 110-114 and may then also store (or link) the relationship of the UEs 110-114 with each other based on their association with the user. This association among the UEs 110-114 may be used as one of the bases for the network services backbone 160 to provide propagation operations to the UEs 110-114. Upon identification of the UEs 110-114 that are associated with one another, various network components may be utilized in propagating signals that trigger a synchronization operation. For example, the IMS 150 may be used in propagating information. In another example and according to the exemplary embodiments, the TAS 170 may be used in propagating information.

The exemplary system and method provide a response propagation mechanism in which a response type performed on a first one of the associated UEs 110-114 is propagated to the other associated UEs 110-114, particularly when at least one of the other associated UEs is incapable of receiving data corresponding to the response type over a packet switched (PS) connectivity. Accordingly, all of the associated UEs may be synchronizated with regard to a call that is received. For example, a cloud feature may enable calls to be dialed and received from all cellular and non-cellular UEs under a single user account. That is, a user may make and receive calls using the other associated UEs 110-114 that were otherwise set up through a MDN registered over a first one of the associated UEs 110-114. Using this association feature, when the UEs 110-114 are acting as the MT UE, a simultaneous alert (e.g., ringing) on all the associated UEs 110-114 may be activated with a concept of call-forking since all the associated UEs 110-114 are registered with an operator network through a SIP signaling protocol. Therefore, a single call may be alerted at a plurality of UEs through forking.

However, with increased usage of UE association and cloud services, features associated therewith may experience potential issues that create an unpleasant user experience. The call forking operation may rely upon each of the associated UEs 110-114 having a PS connectivity. That is, the signals exchanged to synchronize the response to an incoming call utilize a PS connectivity. Thus, when a first one of the associated UEs 110-114 has a PS connectivity, a second one of the associated UEs having a PS connectivity may receive the proper SIP signaling response as either a SIP Cancel (i.e., call completed elsewhere) if the call is answered or as a SIP 486 (i.e., user busy) if the call is rejected. This feature for the other associated UEs may be of significant importance since the other associated UEs will cease performing the alert (e.g., ringing) upon the call being received or rejected on the associated UE. This leads to a potential issue since the SIP signaling may be incapable of being transmitted over a circuit switched (CS) connectivity. For example, when a first one of the associated UEs that has a PS connectivity is used to respond to an incoming call, a second one of the associated UEs that has a CS connectivity may not properly receive the SIP signaling to terminate the alert. Furthermore, a result of the associated UE having the CS connectivity may be an error in a call history as a call may have been responded to on another one of the associated UEs, but the call on the CS connected UE tracks the call as missed. Therefore, the exemplary embodiments provide a call response propagation mechanism that may address this propagation issue, particularly when related to a connectivity issue such as when one of the associated UEs only has CS connectivity.

Figure 4:
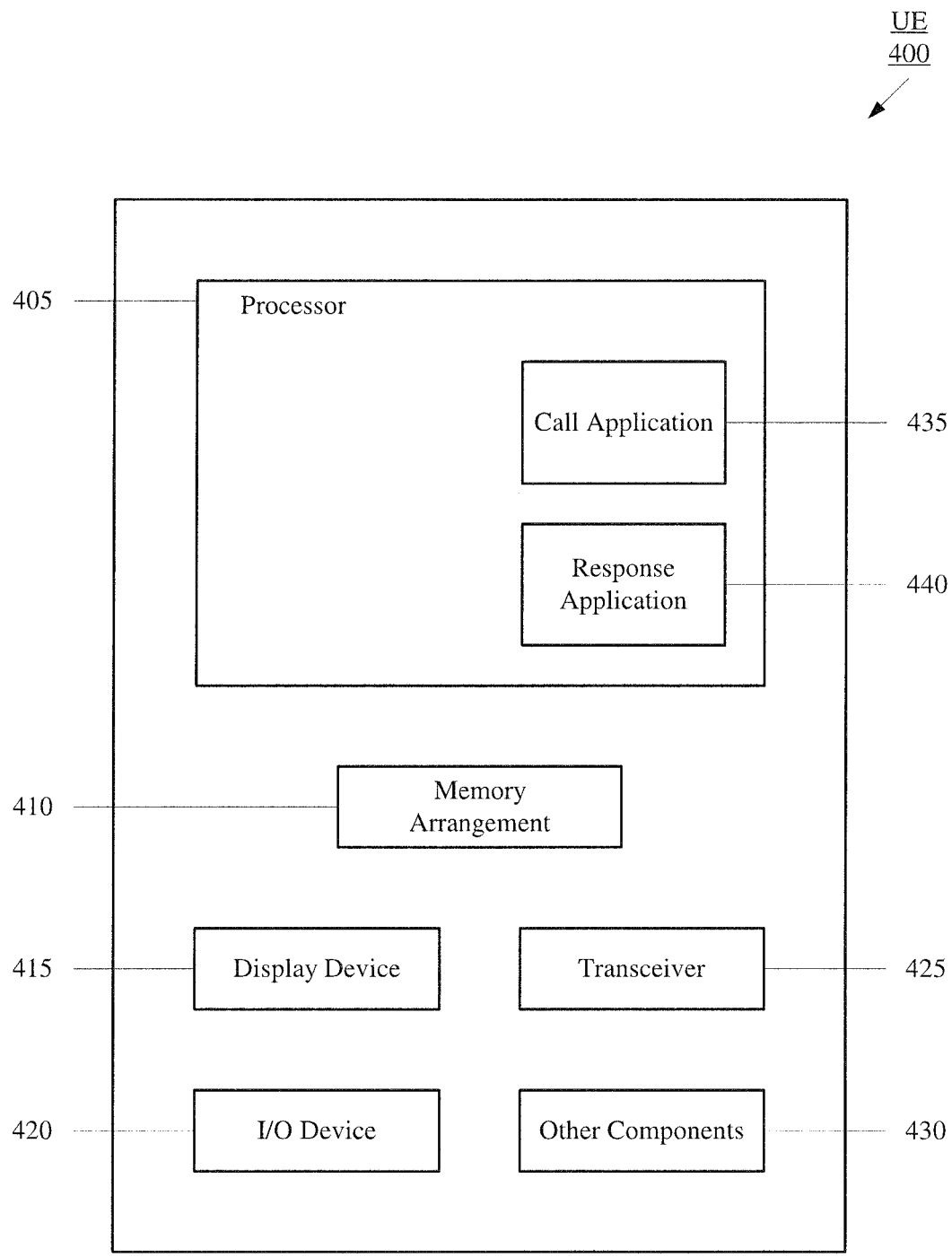
FIG. 4 shows a user equipment configured to propagate a response according to various embodiments described herein.

FIG. 4 shows a UE 400 configured to propagate a mode according to various embodiments described herein. The UE 400 may represent any electronic device that is configured to perform wireless functionalities and may be representative of the UEs 110-114. Specifically, the UE 400 may perform a response to an incoming call that triggers a propagation of that response to the other associated UEs. Using the above example, the UE 400 may correspond to the UE 110 while the other associated UEs may be the UEs 112, 114. However, it is again noted that the UE 400 may also represent the other UEs 112, 114 that may perform substantially similar operations. The UE 400 may be a portable device such as a personal mobile phone, a work issued mobile phone, a tablet computer, a desktop computer, a VoIP phone, a wearable, etc. The UE 400 may also be a client stationary device such as a desktop terminal. The UE 400 may be configured to perform cellular and/or WiFi functionalities. The UE 400 may include a processor 405, a memory arrangement 410, a display device 415, an input/output (I/O) device 420, a transceiver 425, and other components 430. The other components 430 may include, for example, an audio input device, an audio output device, a battery, a data acquisition device, ports to electrically connect the UE 400 to other electronic devices, etc.

The processor 405 may be configured to execute a plurality of applications of the UE 400. For example, the applications may include a web browser when connected to a communication network via the transceiver 425. In another example, the processor 405 may execute a call application 435 that enables the UE 400 to perform a call functionality. It should again be noted that the call functionality may refer to any type of communication session. For example, the communication session may be an audio only call functionality (e.g., phone call), an audio/video communication functionality, etc. Therefore, the call functionality may utilize the MDN of the associated UEs 110-114 such that when acting as a MT UE, an identification used to reach the UEs 110-114.

In a further example and according to the exemplary embodiments, the processor 405 may execute an associated UE response application 440. The response application 440 may receive an input indicating a response to an incoming call. In a first example, the user may not provide any manual input to the incoming call for a variety of reasons such as purposely not answering or inadvertently missing the call (e.g., no response after a minimum number of rings). Accordingly, a first response may be that the call is missed. In a second example, the user may provide a manual input to reject the call. When the call is rejected, the alert may be terminated and the call may be terminated or the call may be redirected to a voicemail functionality. Accordingly, a second response may be that the call is rejected. In a third example, the user may provide a manual input to answer the call. When the call is answered, the alert may be terminated and the user may be connected to perform the real-time communication with another user. Accordingly, a third response may be that the call is answered. The response application 440 may also be configured to generate an appropriate message of the response to the network such as to the IMS 150, the network services backbone 160, and/or the TAS 170. The response application 440 may further be configured to receive a message corresponding to the response to perform subsequent operations such as terminating the alert and updating a call history accordingly.

It should be noted that the call application 435 and the response application 440 being separate applications is only exemplary. The functionality described herein for these two applications 435 and 440 may be implemented in a single application. In addition, the functionality described herein for these two applications 435 and 440 may also be implemented into another application.

It should also be noted that the above noted applications each being an application (e.g., a program) executed by the processor 405 is only exemplary. The functionality associated with the applications may also be represented as a separate incorporated component of the UE 400 or may be a modular component coupled to the UE 400, e.g., an integrated circuit with or without firmware.

The memory 410 may be a hardware component configured to store data related to operations performed by the UE 400. Specifically, the memory 410 may store data related to the call application 435 and the response application 440. For example, a current connectivity of the UE 400 may be stored for transmission to the network components such as the IMS 150 for subsequent use by the exemplary response propagation mechanism. The display device 415 may be a hardware component configured to show data to a user while the I/O device 420 may be a hardware component that enables the user to enter inputs. For example, the call application 435 may enable the user to provide a manual input such as a reject or an answer using the I/O device 420. It should be noted that the display device 415 and the I/O device 420 may be separate components or integrated together such as a touchscreen. The transceiver 425 may be a hardware component configured to transmit and/or receive data. That is, the transceiver 425 may enable communication with other electronic devices directly or indirectly through a network based upon an operating frequency of the network. The transceiver 425 may operate on a variety of different frequencies or channels (e.g., set of consecutive frequencies).

According to various exemplary embodiments, the UEs 110-114 may synchronize a selected response to an incoming call performed on a first one of the associated UEs 110-114 to the other associated UEs 110-114. As discussed above, the UEs 110-114 may be associated with one another and a call forking feature may be utilized such that an incoming call may trigger an alert to be performed on each of the UEs 110-114. It is noted that the call forking feature may be performed for the UEs 110-114 independent of the connectivity type. That is, if the associated UE 110 has a CS connectivity, the associated UE 112 has a PS connectivity, and the associated UE 114 has a PS connectivity, all the UEs 110-114 may still receive an incoming call and initiate the alert. As the transmission of the incoming call to the UEs 110-114 is performed on a network-side operation (e.g., the IMS 150, the network services backbone 160, the TAS 170, and the corresponding access network), proper formatting and routing of the incoming call may be performed on the network-side operation such that all the associated UEs 110-114 receive the incoming call.

When a passive response type (e.g., missed) is determined by the response application 440, the response may be updated on each of the UEs 110-114. For example, a graphic indication may be shown on the display device 415 on each of the UEs 110-114 corresponding to the call that is missed (e.g., an identification of the user performing the incoming call, a time of the call, etc.). In another example, a call history may be updated to reflect the call that is missed (e.g., a graphic indication such as a font color indicating that the call is missed).

When a manual response type (e.g., answered or rejected) is determined by the response application 440 for the incoming call, the manual response may be transmitted to the network components. For example, if the associated UE that responds to the incoming call is utilizing a PS connectivity, a corresponding SIP message may be transmitted corresponding to the manual response. Those skilled in the art will understand that the SIP message may be the SIP Cancel when the call is answered or the SIP 486 when the call is rejected. While the other associated UEs also have a PS connectivity, the SIP message may be properly transmitted and the call forking feature may be addressed. That is, the alert may be canceled and the call history on the associated UE having the PS connectivity, but not used in responding to the incoming call. For example, a graphic indication may be prevented from being shown on the display device 415 as the call is not missed and treated as if the call is answered on the non-responding UE despite not being used. In another example, a call history may be updated to reflect the call being manually responded (e.g., a graphic indication such as a font color indicating the call is answered or rejected).

It is again noted that the above SIP signaling mechanism requires that the associated UEs 110-114 have a PS connectivity. However, if one of the associated UEs 110-114 that is not being used to respond has a CS connectivity, the SIP signaling may not be received and the above described issue may result. Accordingly, the exemplary embodiments provide a mechanism for the CS connected UE to receive the proper message indicating the manual response type performed on another associated one of the UEs 110-114. Specifically, the TAS 170 may receive the manual response type from the associated UE having a PS connectivity and performing the manual response to generate a corresponding message for the associated UE having a CS connectivity. The TAS 170 may also receive information from the other network components such as the IMS 150 and/or the network services backbone 160 that provides an indication of the types of connectivity being used by the associated UEs 110-114. That is, the TAS 170 may be aware of whether each of the associated UEs 110-114 is using the PS connectivity or the CS connectivity.

Figure 5:
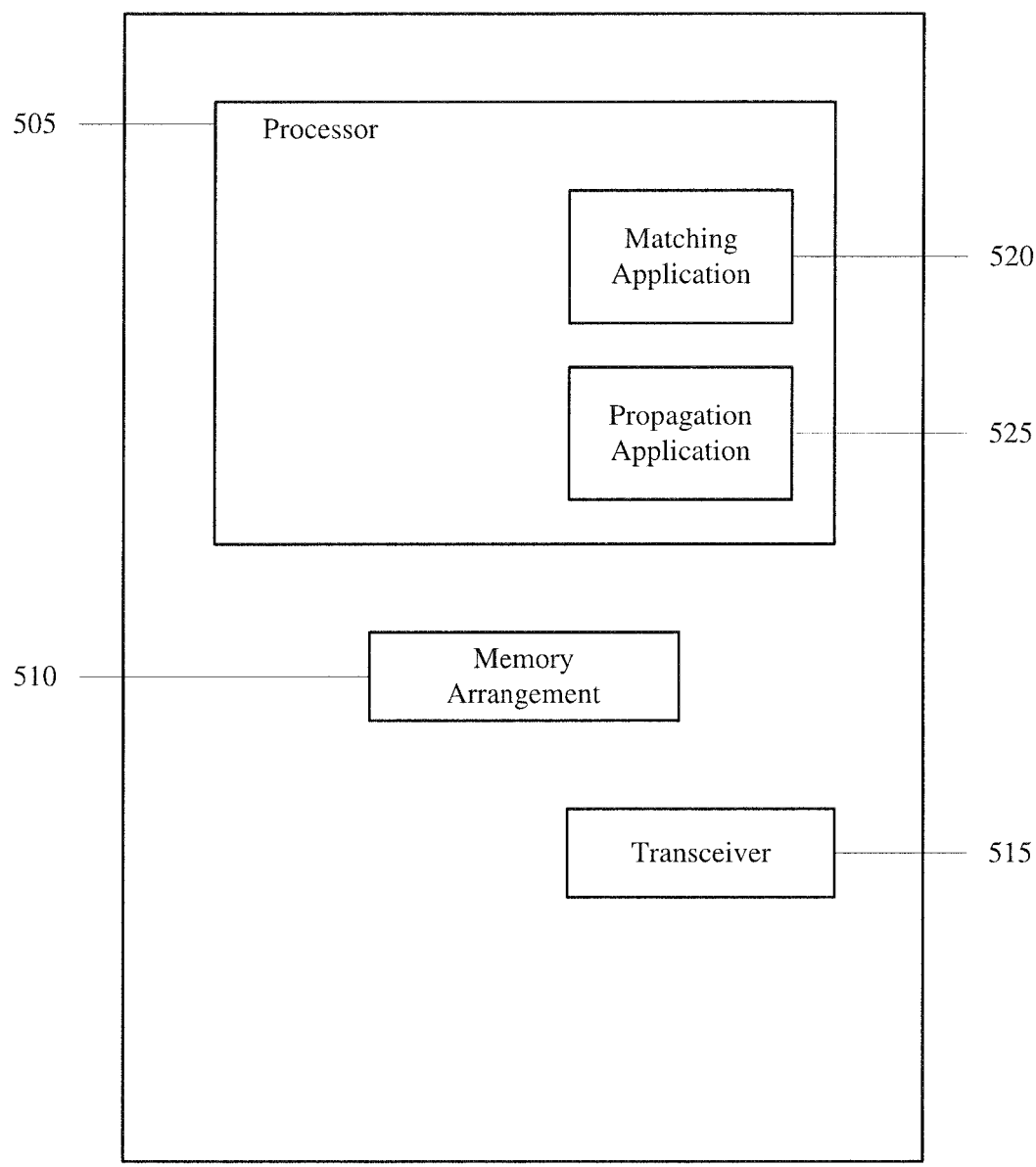
FIG. 5 shows a network component configured to propagate a response according to various embodiments described herein.

FIG. 5 shows the TAS 170 of the system 100 of FIG. 1 configured to propagate a response according to various embodiments described herein. As discussed above, the TAS 170 may perform functionalities unrelated to the routing of messages. The TAS 170 may further perform the response propagation mechanism of the exemplary embodiments. As noted above, the operations described herein for the TAS 170 may relate to when at least one of the associated UEs that is not used in responding to an incoming call has a CS connectivity. The TAS 170 may be preconfigured with a variety of parameters to perform its functionalities. For example, an administrator may enter a table of corresponding SIP signals to cause codes such that an operation involving a matching of a SIP signal to the cause code may be performed. The TAS 170 may represent any electronic device that is configured to perform the functionalities described herein. The TAS 170 may include a processor 505, a memory arrangement 510, and a transceiver 515 that provide functionalities substantially similar to those corresponding to the UE 200. It should be noted that the TAS 170 may also include further components such as a display device and an I/O device that enable the administrator to configure the TAS 170 to perform its intended functionalities. However, it should also be noted that the TAS 170 may be configured to receive these instructions via the transceiver 515 to automatically implement the policies upon reception.

The processor 505 may be configured to execute a matching application 520. The matching application 520 may determine a correspondence between a received SIP signal and a cause code. As discussed above, the SIP signal may be a SIP Cancel or a SIP 486 based upon the type of manual response. The cause code may be used in a signaling operation to identify and debug events occurring therein. For example, a first cause code may be cause code 26 (CC26). Those skilled in the art will understand that the CC26 may correspond to a "non-selected user clearing". A second cause code may be cause code 24 (CC24). Those skilled in the art will understand that the CC24 may correspond to a "call rejected due to feature at destination." Accordingly, the matching application 520 may perform a matching correspondence between the received SIP signals and the cause codes. Specifically, when the user answers the incoming call on one of the associated UEs 110-114 having a PS connectivity (i.e., call answered), the TAS 170 may receive the answer response type of a SIP Cancel and match to the CC26. When the user rejects the incoming call on one of the associated UEs 110-114 having a PS connectivity (i.e., call rejected), the TAS 170 may receive the response type of a SIP 486 and match to the CC24. The processor 505 may be configured to execute a propagation application 525. The propagation application 525 may transmit the SIP signal to the non-responding associated UEs having a PS connectivity and transmit the matched cause code to the non-responding associated UEs having a CS connectivity.

Figure 6:
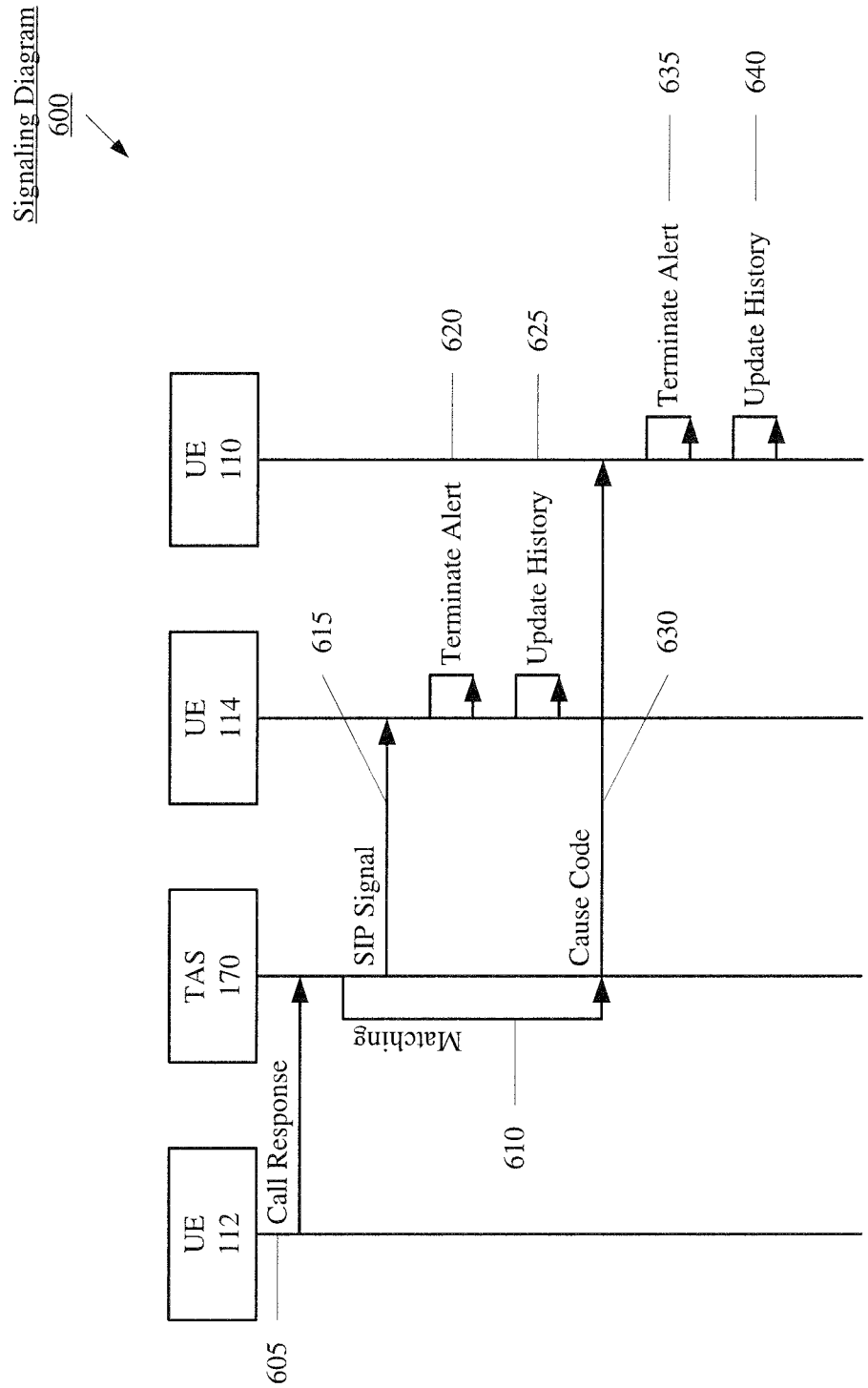
FIG. 6 shows a signaling diagram for propagating a response according to various embodiments described herein.

FIG. 6 shows a signaling diagram 600 for propagating a response according to various embodiments described herein. The signaling diagram 600 may relate to an overall process relating to responding to an incoming call using one of the associated UEs 110-114 and propagating the response type to the other associated UEs 110-114. Specifically, the signaling diagram 600 may relate to when at least one of the associated UEs has a CS connectivity. The signaling diagram 600 is illustrated with the UEs 110-114 and the TAS 170. However, as will be described below, there may be further components utilized in performing the process such as the IMS 150, the network services backbone 160, and other network components such as a mobile switching center (MSC).

Initially, the association of the UEs 110-114 may be determined such as using functionalities of the IMS 150 and the network services backbone 160. The connectivity of the UEs 110-114 may also be determined using the functionalities of the IMS 150 and the network services backbone 160. For example, base station(s) with which each of the UEs 110-114 is associated may provide information to the IMS 150 and/or the network services backbone 160 that tracks the connectivity. In this manner, the TAS 170 may be provided an indication to perform the operations described herein with the signaling diagram 600.

As noted above, the UE 112 that is used to respond to an incoming call may have a PS connectivity. The UE 114 that receives the indication of the response type may also use a PS connectivity, while the UE 110 that receives the indication of the response type may be using a CS connectivity. Thus, in this example, UE 112 has PS connectivity, UE 114 has PS connectivity and UE 110 has CS connectivity.

In the signaling diagram 600, the UE 112 may respond to the incoming call. It may be assumed that the user of the UE 112 performs a manual response and the call is not missed. Accordingly, a call response 605 is transmitted to the TAS 170. For example, the UE 112 may be connected to the LTE-RAN 122 and transmits the corresponding SIP signal to the base station of the LTE-RAN 122. The LTE-RAN 122 may forward the SIP signal to the IMS 150 and other network components. The call response 605 may be the SIP Cancel (when the call is answered) or the SIP 486 (when the call is rejected).

When the TAS 170 receives the call response 605, the TAS 170 may utilize the information related to the connectivity of the UEs 110-114. Since the information indicates that the UE 110 has a CS connectivity, the TAS 170 may perform a matching 610. The matching 610 may correspond the SIP signal to the appropriate cause code, for example, as indicated in the table with the predetermined correspondences.

The TAS 170 may propagate the response type to the UE 114 and the UE 110. Since the UE 114 has a PS connectivity, the TAS 170 may transmit the response type via the SIP signal 615. Specifically, when the call response 605 is the SIP Cancel, a corresponding SIP signal may be forwarded to the UE 114 to perform operations based upon the received corresponding SIP Cancel signal. Specifically, the UE 114 may perform an alert termination 620 (e.g., cease a ringing functionality) and perform a call history update 625 (e.g., marking the call on the UE 114 as answered). When the call response 605 is a SIP 486, a corresponding SIP signal may be forwarded to the UE 114 to perform operations based upon the received corresponding SIP 486 signal. Specifically, the UE 114 may perform an alert termination 620 (e.g., cease a ringing functionality) and perform a call history update 625 (e.g., marking the call on the UE 114 as rejected). The corresponding SIP signal may be forwarded to the UE 114 using various network components such as through the IMS 150 and the base station to which the UE 114 is connected.

Since the UE 110 has a CS connectivity, the TAS 170 may transmit the matched cause code 630 to the UE 110. When the call response 605 is the SIP Cancel, a corresponding cause code 630 of a CC26 may be forwarded to the UE 110 to perform operations based upon the received corresponding CC26. Specifically, the UE 110 may perform an alert termination 635 (e.g., cease a ringing functionality) and perform a call history update 640 (e.g., marking the call on the UE 110 as answered). When the call response 605 is a SIP 486, a corresponding cause code 630 of a CC24 may be forwarded to the UE 110 to perform operations based upon the received corresponding CC24. Specifically, the UE 110 may perform an alert termination 635 (e.g., cease a ringing functionality) and perform a call history update 640 (e.g., marking the call on the UE 114 as rejected). The CC26 and the CC24 may be forwarded to the UE 110 using various network components such as through a MSC and a base station to which the UE 110 is connected.

Figure 7:
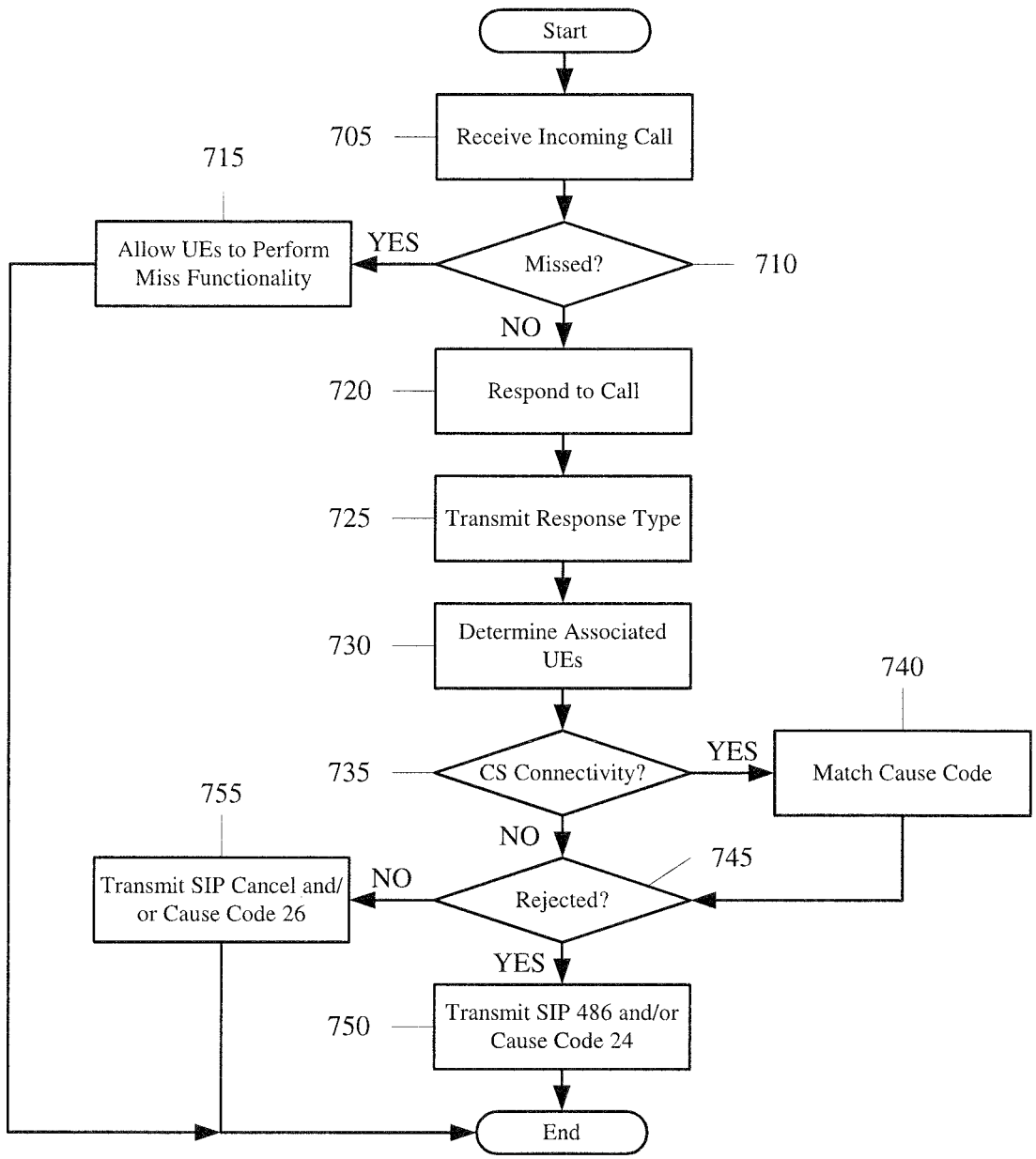
FIG. 7 shows an exemplary method for propagating a response according to various embodiments described herein.

FIG. 7 shows an exemplary method 700 for propagating a response according to various embodiments described herein. The method 700 will be described with regard to the network arrangement 100 of FIG. 1, the UE 400 of FIG. 4, and the TAS 170 of FIG. 5. As discussed above, the UE 400 may represent each of the UEs 110-114 and the UEs 110-114 may be associated with one another. The description of the method 700 will be described with regard to the UE 110 having a CS connectivity (e.g., connected to the legacy RAN 120) while the UEs 112, 114 have a PS connectivity (e.g., connected to the LTE-RAN 122). The description of the method 700 will also be described with regard to the UE 112 being used to respond to the incoming call.

In 705, the UE 112 receives the incoming call. As described above, the incoming call may also be received by the UE 110 and 114 using the call forking functionality due to the association of the UEs 110-114. In 710, the UE 112 determines whether the incoming call is missed. For example, the incoming call may be determined to be missed after a predetermined time limit of no response being received or after a preset number of rings being played out.

If the incoming call is missed (i.e., a passive response type), the UE 112 continues the method 700 to 715. In 715, the UE 112 allows the UE 112 to perform a miss functionality. Specifically, the UE 112 may generate an indication on the display device 415 that the incoming call is missed and any associated information. It is noted that the UEs 110 and 114 may also have had the incoming call missed to perform a substantially similar miss functionality.

Returning to 710, if the call is not missed, the UE 112 continues the method 700 to 720. Since the call is not missed, the user has manually responded to the incoming call. In 720, the UE 112 responds to the call. Specifically, the incoming call may be answered or rejected. In 725, the UE 112 transmits the response type to the network. For example, since the UE 112 has a PS connectivity, the UE 112 transmits a SIP Cancel when the incoming call is answered or a SIP 486 when the incoming call is rejected.

In 730, the TAS 170 determines the UEs that are associated with the UE 112. As described above, the TAS 170 may receive information about which UEs are associated or linked to the UE 112 such as from the IMS 150 and/or the network services backbone 160. In this manner, the TAS 170 may determine that the UEs 110, 114 are associated with the UE 112. In 735, the TAS 170 determines a connectivity of the associated UEs 110, 114. As described above, the TAS 170 may also receive information about the connectivity of the associated UEs such as from the base stations to which the UEs 110, 114 are connected.

If the TAS 170 determines that at least one of the UEs 110, 114 has a CS connectivity, the TAS 170 continues the method 700 to 740. Specifically, the TAS 170 may determine that the UE 110 has a CS connectivity while the UE 114 has a PS connectivity. In 740, the TAS 170 determines a matching operation to match the SIP signal of the response type to the cause code (e.g., SIP Cancel to CC26 and SIP 486 to CC24).

In 745, the TAS 170 determines whether the response type is indicative that the incoming call was rejected on the UE 112. That is, the TAS 170 determines whether the SIP 486 is received. If the incoming call is rejected, the method 700 continues to 750. In 750, the TAS 170 transmits the SIP 486 or a corresponding SIP signal to the UE 114 as the UE 114 has a PS connectivity. The TAS 170 also transmits the CC24 to the UE 110 as the UE 110 has a CS connectivity. If the incoming call is answered, the method 700 continues to 755. In 755, the TAS 170 transmits the SIP Cancel or a corresponding SIP signal to the UE 114 as the UE 114 has a PS connectivity. The TAS 170 also transmits the CC26 to the UE 110 as the UE 110 has a CS connectivity. Through receiving the corresponding SIP signal or the cause code, the UEs 110, 114 are capable of performing the appropriate operations based upon the received signal such as terminating an alert and updating a call history accordingly.

The exemplary embodiments provide a device, system, and method of propagating a response performed on one of a plurality of associated UEs to the other associated UEs. The exemplary embodiments address when at least one of the other associated UEs has a CS connectivity that is incapable of receiving a SIP signal otherwise used to propagate the response over a PS connectivity. Specifically, the response type may be matched to a cause code that is transmitted to the UE using the CS connectivity that triggers the appropriate operations as if the corresponding SIP signal had been received.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
    at a user equipment (UE) configured to establish a network connection using one of a circuit switched (CS) connectivity or a packet switched (PS) connectivity:
        receiving a user input indicating a mode into which to set both the UE and at least one further UE, wherein a same mobile device number is associated with the UE and the at least one further UE;
        determining whether the connection is one of the CS connectivity or the PS connectivity; and
        when the connection is the CS connectivity, generating a short messaging service (SMS) message that is to be provided to the at least one further UE via the network connection, wherein the SMS message indicates to the least one further UE the mode corresponding to the user input.

2. The method of claim 1, further comprising:
    transmitting the SMS message with a destination corresponding to the same mobile device number.

3. The method of claim 1, wherein the SMS message comprises a trigger that initiates a mode change operation in the at least one further UE to the indicated mode when the SMS message is received.

4. The method of claim 1, further comprising:
    when the connection is the PS connectivity, generating a PS message including one or more data packets indicating the mode; and
    transmitting the PS message to a PS network.

5. The method of claim 1, wherein the mode is one of a Do Not Disturb mode, a sleep mode or a wake mode.

6. The method of claim 1, further comprising:
    receiving a connectivity indication for each of the at least one further UEs, wherein the connectivity indication indicates if the at least one further UE has CS connectivity or PS connectivity;
    when the connection is the PS connectivity and when at least one of the at least one further UE has CS connectivity, generating the SMS message that indicates the mode corresponding to the input; and
    transmitting the SMS message with a destination corresponding to the same mobile device number.

7. A user equipment, comprising:
    a transceiver configured to establish a network connection using one of a circuit switched (CS) connectivity or a packet switched (PS) connectivity; and
    a processor configured to receive a user input indicating a mode in which to set both the user equipment and at least one further user equipment associated with the user equipment, wherein a same mobile device number is associated with the user equipment and the at least one further user equipment, the processor further configured to determine whether the connection is one of the CS connectivity and the PS connectivity, the processor, when the connection is the CS connectivity, configured to generate a short messaging service (SMS) message that is to be provided to the at least one further user equipment via the network connection, wherein the SMS indicates to the at least one further user equipment the mode corresponding to the user input.

8. The user equipment of claim 7, wherein the transceiver is further configured to transmit the SMS message with a destination corresponding to the mobile device number, wherein the SMS message comprises a trigger that initiates a mode change operation in the at least one further user equipment to the indicated mode when the SMS message is received.

9. The user equipment of claim 7, wherein the processor is further configured to, when the connection is the PS connectivity, generate a PS message including one or more data packets indicating the mode and the transceiver is further configured to transmit the PS message to a PS network.

10. A processor of a user equipment (UE) configured to establish a network connection using one of a circuit switched (CS) connectivity or a packet switched (PS) connectivity, wherein a same mobile device number is associated with the UE and a further UE, the processor configured to perform operations comprising:
    receiving a message from the further UE via the network connection, the message indicating that the UE is to perform a mode change operation and further including a selected mode for the UE, wherein the selected mode is based on user input received at the further UE and is to be utilized by both the UE and the further UE, wherein the message is a generated SMS message received from a CS network via the CS connectivity that is to be provided to the at least one further UE via the network connection; and
    performing the mode change operation to change the UE into the selected mode.

11. The processor of claim 10, wherein the message is a PS message including one or more data packets received from a PS network via the PS connectivity.

12. The processor of claim 10, wherein the SMS message includes a trigger indicating to the UE that the SMS message is not to be displayed on the UE.

13. The processor of claim 10, wherein, when the UE determines that the UE generated the message, the UE does not perform the mode change operation.

14. The processor of claim 10, wherein the operations further comprise configuring a notification that the UE has changed into the selected mode, the notification to be displayed on a display of the UE.

* * * * *